Figure 1:
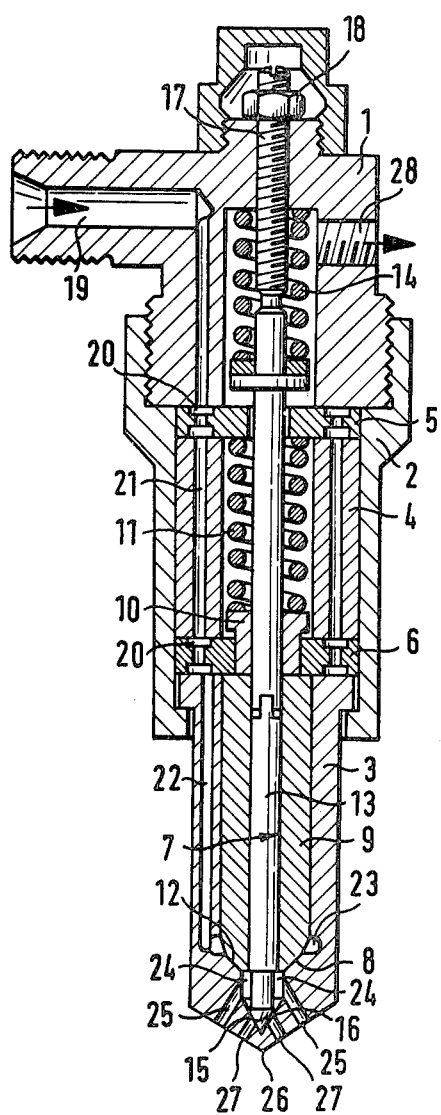

United States Patent [19]

Keiczek

[11] 4,202,500
[45] May 13, 1980

[54] MULTI-HOLE INJECTION NOZZLE

[75] Inventor: Hubert Keiczek, Nuremberg, Fed. Rep. of Germany

[73] Assignee: Maschinenfabrik Augsburg-Nuernberg Aktiengesellschaft, Nuremberg, Fed. Rep. of Germany

[21] Appl. No.: 884,268

[22] Filed: Mar. 7, 1978

[30] Foreign Application Priority Data

Mar. 9, 1978 [DE] Fed. Rep. of Germany ....... 2710138

[51] Int. Cl.$^2$ ........................................... F02M 45/08
[52] U.S. Cl. ................................................ 239/533.3
[58] Field of Search ............ 239/533.3, 533.9, 533.12, 239/88, 89, 90, 91, 96, 584

[56] References Cited

U.S. PATENT DOCUMENTS 3,831,846  8/1974  Gerz et al. ............................. 239/90

FOREIGN PATENT DOCUMENTS 2640908  3/1933  Fed. Rep. of Germany ........ 239/533.3

Primary Examiner—James B. Marbert
Attorney, Agent, or Firm—Karl H. Gross

[57] ABSTRACT

A multi-hole injection nozzle for air-compressing direct-injection internal combustion engines includes a first nozzle needle which is hollow, and a second nozzle needle which is axially slidable in an axial bore of the first needle. The first needle can close one or more nozzle holes which are spaced from the tip of the injection nozzle and the second needle can similarly close one or more nozzle holes which are, however, close to the tip and which have respectively different cross-sectional areas.

24 Claims, 9 Drawing Figures

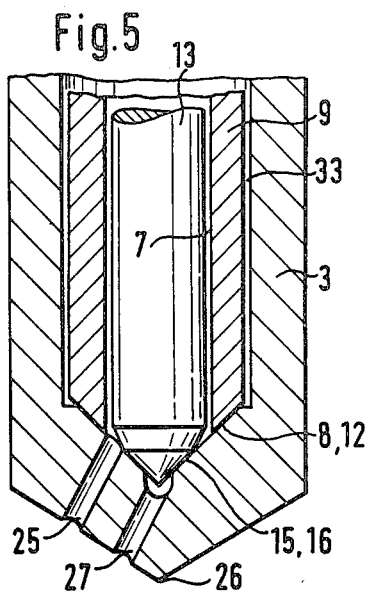
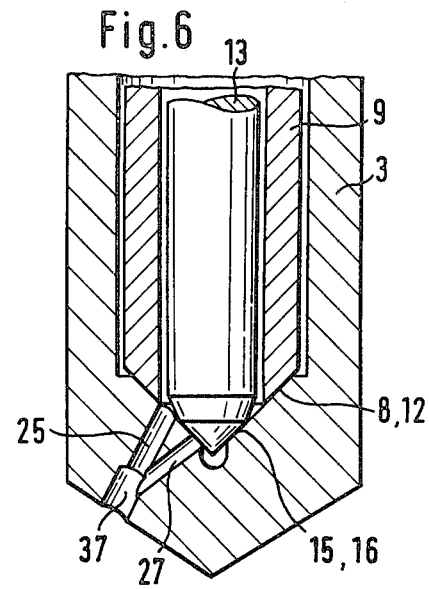
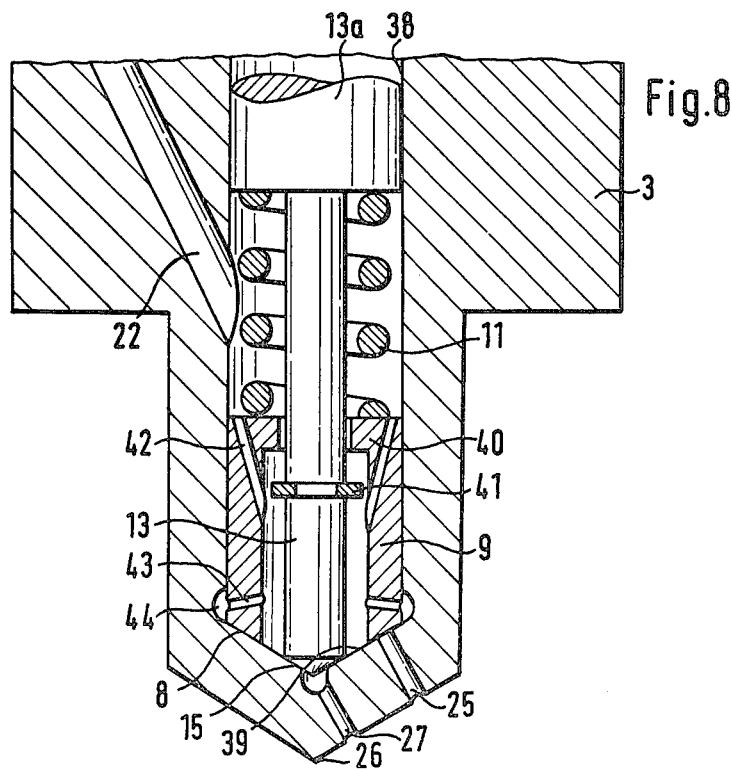

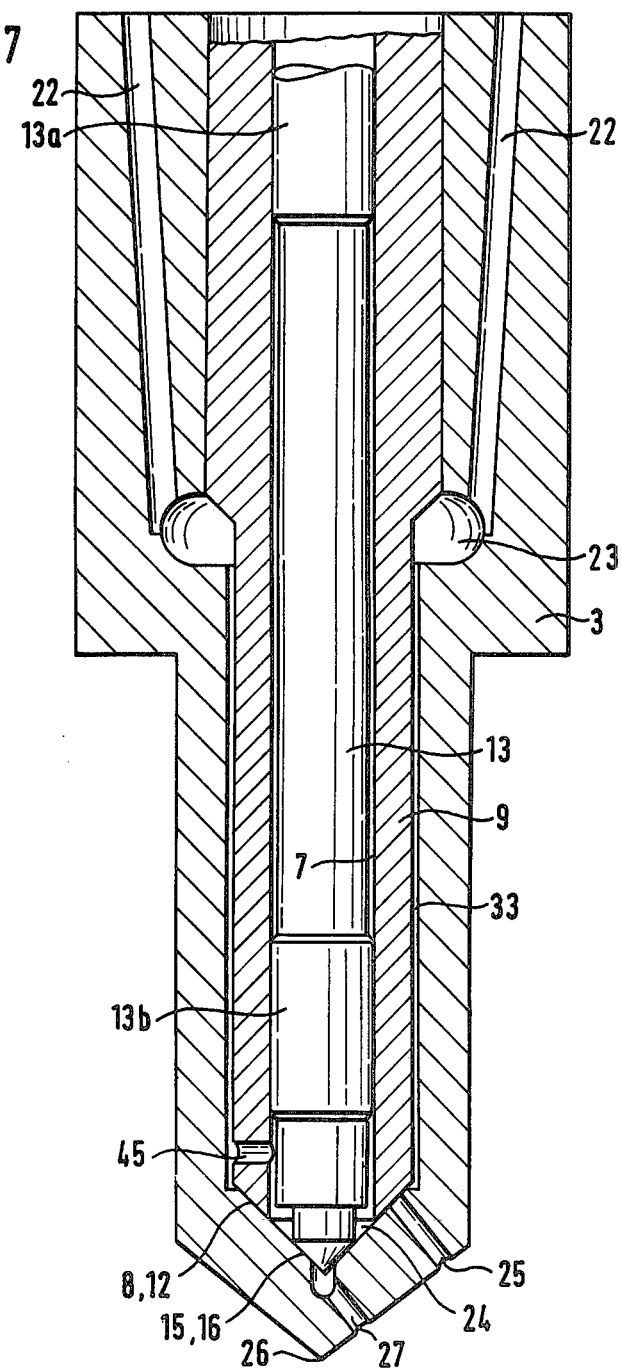

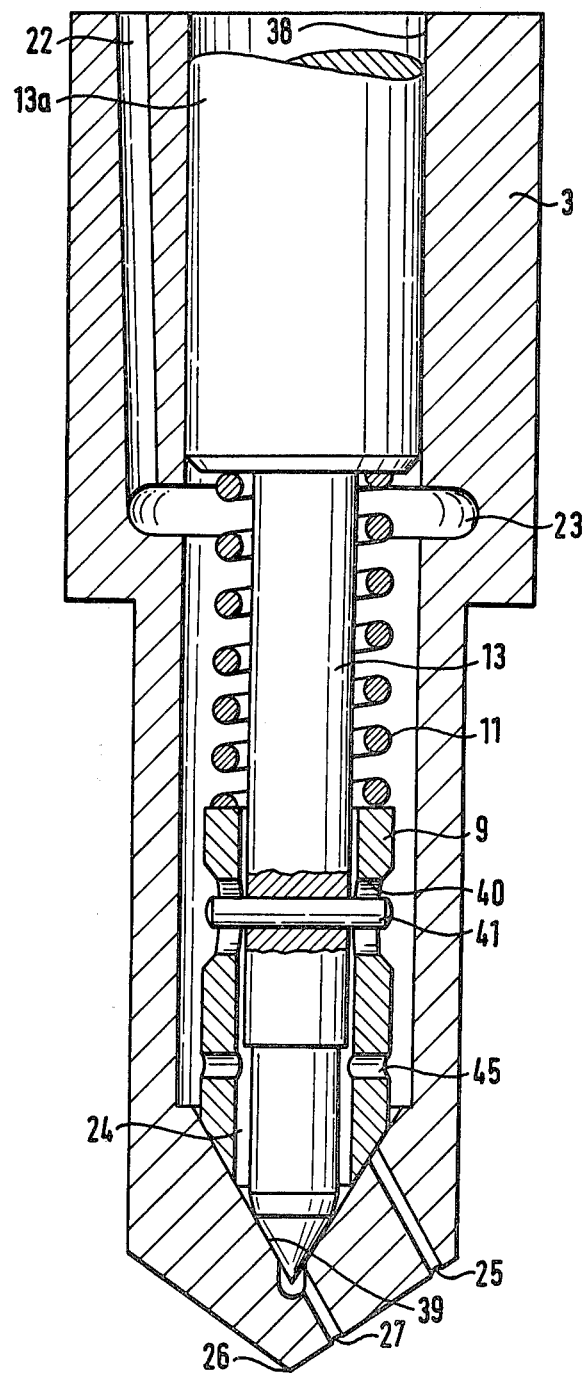

MULTI-HOLE INJECTION NOZZLE

The invention relates to a multi-hole injection nozzle for air-compressing direct-injection internal combustion engines employing the method of wall deposition of the fuel, said injection nozzle consisting essentially of a nozzle body and nozzle needles maintained by springs in their positions where the nozzle holes in the nozzle body are closed, said springs being designed in a manner that one nozzle needle will initially open at a low fuel pressure whereas the second nozzle needle is lifted off its seat only at an increased fuel pressure.

Such an injection nozzle which, however, is not suitable for internal combustion engines employing the method of wall deposition of the fuel was disclosed earlier by the DT-OS 1,914,742. The injection nozzle according to that disclosure has two nozzle needles arranged side by side in the nozzle body which are each pressed onto the seat by a spring. While the fuel pressure is still low, one of the two nozzle needles opens a plurality of radially disposed nozzle holes provided on the perimeter of the nozzle body through a central blined-end bore, the nozzle holes being located as close as possible at the tip of the nozzle body. The second nozzle needle will come into operation only when the pressure has undergone a very pronounced increase. As soon as the fuel reaches a predetermined pressure level, the nozzle needle will open a second row of nozzle holes located at a greater distance from the combustion chamber and, consequently, from the tip of the injection nozzle through blind-end bores arranged around the central blind-end bore.

The injection nozzle according to the earlier disclosure is intended to ensure a uniform distribution of the fuel over the complete combustion chamber and, thereby, efficient atomization of the fuel in all load ranges of the engine. The drawback of that nozzle is in the fact that the nozzle inherently has a very large diameter and is difficult or impossible to accommodate in the cylinder head of an internal combustion engine. Apart from that, it is specially developed as mentioned above to provide absolutely fine atomization of the fuel and direct mixing with the air for combustion. Injection nozzles of this type are unsuitable for internal combustion engines employing the wall deposition method of fuel injection where injection has to be effected in a completely different manner. Primarily, the fuel in these engines should substantially be injected in only one direction and has to be accurately metered. In particular, it has been found in such engines that undesirable blue smoke or white smoke formation is liable to occur in the lower speed and load ranges which causes annoyance and irritation of the eyes and respiratory organs. The reason for this is in a deficient incomplete combustion resulting from too low a temperature of the combustion chamber wall which encourages the formation of aldehydes, acrolene, unburned hydro-carbons etc.

In order to overcome this problem, it was previously proposed to increase the compression ratio of the engine or to install a swirl destroyer for the air for combustion rotating in the combustion chamber. Furthermore, attempts have been made to vary the position of the fuel jet in the operating ranges referred to in a manner that the proportion of fuel mixing directly with the air for combustion is suitably increased.

However, all these measures led to a substantial increase in costs and also to an enhanced vulnerability of the engine so that they were soon abandoned again.

Furthermore, there have been proposals for the use of controlled multi-hole injection nozzles where, in the lower speed and load ranges, the nozzle needle is lifted only by a smaller amount off its seat whereby a partial fuel injection is produced through one or several nozzle holes. In the upper speed and load ranges, the nozzle needle is further lifted by the increasing pressure until a cylindrical pin guided in a blind-end bore clears the bore and, thereby, opens further nozzle holes which join the bore so that the full cross-sectional area is available for injection. This type of injection nozzle has proved its value already and afforded good results during testing. It suffers from the one disadvantage that it is relatively difficult to make and, mainly as a result of the cylindrical sealing produced by the pin, it is unlikely to give satisfactory performance over an extended period of time. The reason for this appears to be in the use of only one nozzle needle.

This is the starting point of the present invention which has for its object to further develop an injection nozzle of the type initially described, i.e. with two separate nozzle needles, so that it has in particular a minimum diameter at its end facing the cylinder, is easy to manufacture, affords reliable working and lends itself also to engines which employ the method of wall deposition of the fuel.

According to the invention, this object is achieved in that one nozzle needle is designed as a hollow needle and has a second nozzle needle arranged axially slidable in its axial bore and in that the hollow needle enables one or a plurality of nozzle holes arranged at a distance from the tip of the injection nozzle to be closed and in that the second nozzle needle enables one or a plurality of nozzle holes located near the tip and having different cross sectional areas to be closed.

Such a configuration can be relatively easily produced because the sealing surfaces in each case cooperate with separate nozzle needles and may be of conical or spherical shape. Moreover, the nozzle has only a small diameter so that it can be readily accommodated. If the fuel is to be deposited film-wise on the combustion chamber wall, this can conveniently be achieved by arranging the nozzle holes substantially parallel with each other and in one direction instead of radially on the perimeter of the injection nozzle.

The faces of the nozzle needles acted upon by the fuel and/or the springs forcing the nozzle needles onto their seats are designed or selected according to the present invention in a manner that one of the two nozzle needles is lifted off its seat already during starting or idling of the engine, whereas the other nozzle needle will open only in the upper load range. It is immaterial which needle is made to do this, in other words, either the hollow needle or the second nozzle needle may open first depending on the physical arrangement.

As a further development of the invention, it is proposed to have at least the second nozzle needle made up of a plurality of individual parts arranged axially in tandem with different degrees of accurate machining or to provide the guiding faces or sealing faces respectively only with only the length to make them serve their purpose. This will simplify manufacture.

Figure 2:
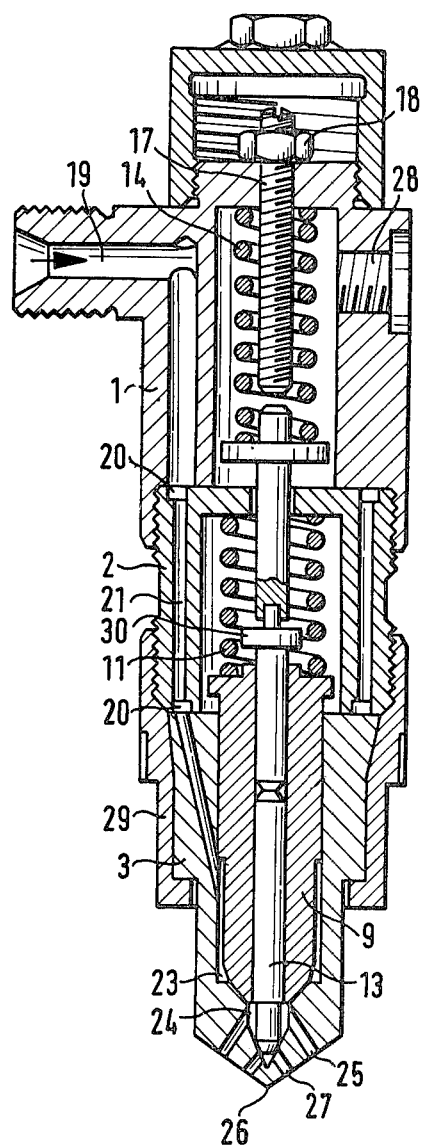

Further details of the invention and the great variety of possible physical arrangements may be deduced from the subclaims and the following description of a number of typical embodiments which are illustrated in the accompanying drawings in which FIGS. 1 and 2 are each a longitudinal section through an injection nozzle according to the invention but with different layouts, FIGS. 3 to 9 are different embodiments of injection nozzles covered by the present invention with the figures showing only a section of the lower ends of the injection nozzles.

The injection nozzle according to FIG. 1 consists of a connection piece 1 which is connected by an intermediate piece 2 with a nozzle body 3. A spacer 4 and two abutting rings 5 and 6 are slid into the intermediate piece 2. Fitted slidably in the nozzle body 3 is a hollow needle 9 provided with a bore 7 and a truncated cone shaped seat 8 which is forced via a spacer 10 having a smaller diameter by a spring 11 between spacer 10 and abutting ring 5 onto the mating seat 12 in the nozzle body 3. The bore 7 houses a second axially slidable nozzle needle 13 consisting of two parts in tandem which is forced by a spring 14 provided in the connection piece 1 with its seating face 15 which is also of truncated cone shape onto the mating seat 16 in the nozzle body 3. A screw 17 with a lock nut 18 arranged on top of the nozzle needle 13 permits the maximum lift of the nozzle needle 13 to be adjusted, whereas the lift of the hollow needle 9 is limited by the abutting ring 6 and is not adjustable. Fuel admission is through a hole 19 in the connection piece 1, annuli 20 in, or respectively, on the abutting rings 5, 6, holes 21 in the spacer 4 and holes 22 in the nozzle body 3. The latter terminate in an annular main pressure space 23 formed above the mating seat 12 in the nozzle body. Between the mating seats 12 and 16, there is another annular space 24 which accepts fuel only after the hollow needle 9 opens and in which in FIG. 1 terminate two nozzle holes 25. Below the mating seat 16 there are another two nozzle holes 27 located closer to the tip 26 of the injection nozzle which extend to the outside. A leak oil pipe 28 discharges any fuel that forced passed the needle guides.

The springs 11 and 14 as well as the faces acted upon by the fuel on the nozzle needles 9 and 13 are proportioned so that the hollow needle 9 will be opened while the pressure build-up in the main pressure space 23 is still at a low level such as exists during idling and in the low speed and load ranges of an engine. As a result, there will be partial fuel injection through the nozzle holes 25. In the upper speed and load ranges, the pressure will rise considerably to open also the second nozzle needle 13 so that maximum injection is possible through the nozzle holes 25 and 27. The free cross sectional areas of the nozzle holes 25 and 27 may obviously be of different size according to requirements.

FIG. 2 shows the same parts designated by the same reference numerals as in FIG. 1. The connection piece 1 is here connected via an intermediate piece 2 and a nozzle body holder 29 with the nozzle body 3 with the intermediate piece 2 serving simutaneously as an abutment for the spring 11 and being provided with the annuli 20 as well as holes 21 for the fuel admission. Above the hollow needle 9, the second nozzle needle 13 is formed with a collar 30 which contacts the hollow needle 9 during opening. Only when the second nozzle needle 13 opens will it be possible for the hollow needle 9 to reach its full lift position. Another essential feature is that the main pressure space 23 is formed by a reduced diameter of the hollow needle 9 and is formed with a relatively long length in the axial direction.

Figure 3:
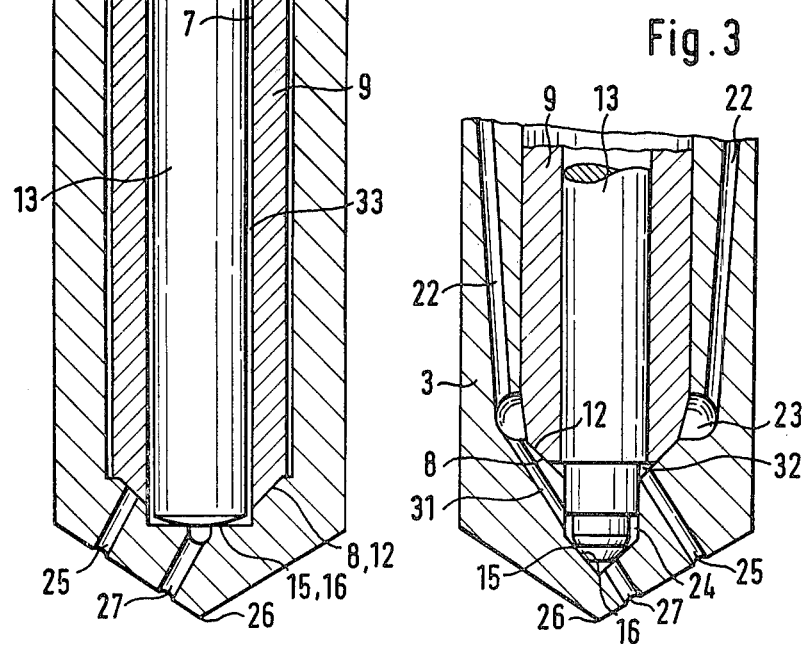

FIG. 3 shows a different configuration of the lower part of the injection nozzle according to FIG. 1 where the main pressure space 23 communicates permanently through holes 31 with the annulus 24 (i.e. also when the hollow needle 9 is closed). Thus, as soon as fuel is admitted, the pressure will simultaneously act on both nozzle needles 9, 13 and the first needle to open whether 9 or 13 will be the one whose spring 11, 14 (FIG. 1) is weaker. The nozzle holes 25 terminate in a separate annulus 32 which is supplied with fuel when hollow needle 9 opens.

Figure 4:
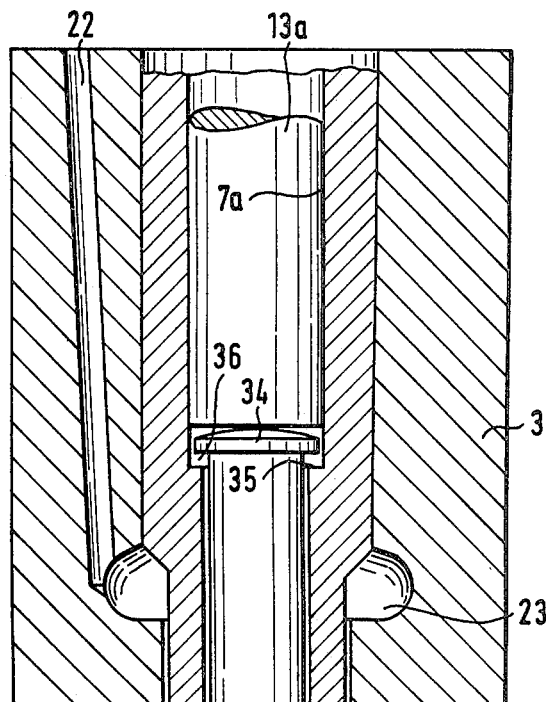

Another possible embodiment of the injection nozzle according to the invention is shown in FIG. 4. It is specially suitable where there is only little space available in the cylinder head of an internal combustion engine because its outer diameter at its lower end is very small. This is achieved mainly due to the fact that the main pressure space 23 and the guide of the hollow needle 9 in the nozzle body 3 are placed at a much higher level.

From the main pressure space 23 down to the seating faces 8, 12 of the hollow needle 9 there is ample clearance 33 between the latter and the nozzle body 3 to permit easy passage of the fuel. At the same time, this will facilitate manufacture because there is no need for an accurate fit in this section. The lower part of the second nozzle needle 13 which has a spherical seating face 15 is similarly arranged axially slidably with a large clearance in the bore 7 of the hollow needle 9 whereby machining is further simplified. At the end of the nozzle needle 13 remote from the nozzle holes 25, 27, the nozzle needle 13 is formed with a flange 34 which lies in a greater diameter bore 7a of the hollow needle 9 which provides an abutment 35. A clearance 36 exists between the abutment 35 and the flange 34 with the nozzle needles 9, 13 closed. In the axial continuation of the upper end of the nozzle needle 13, there is a sealing element 13a guided and tightly sealing in the bore 7a which is pressed against the flange 34 by a spring 14 (FIG. 1) which is not shown in FIG. 4. When the hollow needle 9 is lifted off its seat 12 by the pressure of the fuel and the nozzle hole 25 is opened, the clearance 36 will decrease until the abutment 35 rests against the flange 34 and, as the opening movement continues, causes the second nozzle needle 13 to open, too. It should be mentioned also that the nozzle hole 25 does not terminate in an annulus but directly into the seat 12 for the hollow needle 9.

FIG. shows the lower part of the injection nozzle which is essentially shown already in FIG. 4, except that the nozzle hole 25 terminates in the clearance 7 between the hollow needle 9 and the inner needle 13.

Compared with the injection nozzle according to FIG. 4, FIG. 6 again only shows a different arrangement of the nozzle holes where the nozzle holes 25 and 27 controllable by the hollow needle 9 and the inner needle 13 are jointed together before emitting from the nozzle body 3 in a hole 37. This offers an advantage in that, if any leakages occur on the seating facings 15, 16 of the nozzle needle 13, carbonization of the nozzle hole 27 will be prevented.

Compared to the embodiment according to FIG. 4, FIG. 7 shows a slightly modified injection nozzle where the fuel is passed from the main pressure space 23 through the annulus 33 and the ports 45 provided in the hollow needle 9 into the annulus 24 which was already shown in FIG. 1 and which is isolated from the outside by a sealing element 13b fitted to or formed integral with the second nozzle needle 13. This again affords the possibility, depending on the design of the springs 11, 14 (FIG. 1) to have either the hollow needle 9 or the second nozzle needle 14 open first. A simplification of manufacture is obtained in as much as the bore 7 in the hollow needle 9 has the same diameter throughout.

According to FIG. 8, the nozzle body 3 has a blind-end bore 38 with a constant diameter throughout with the bottom forming a conical seat 39 which is contacted both by the seating face 8 of the hollow needle 9 and the seating face 15 of the second nozzle needle 13. This is a feature which in itself results in a straight-forward design for ease of manufacture. The hollow needle 9 is formed as a short sleeve having its end opposite to the seating face 8 formed with an abutting face 40 and is guided in the blind-end bore 38. The second nozzle needle 13 is firmly connected to the sealing element 13a, and, below the abutting face 40, is provided—at a distance corresponding to the needle lift—with a ring-shaped dog 41 which may take the form of a circlip clamped on the nozzle needle 13. Acting on the abutting face 40 is a spring 11 which holds the hollow needle 9 in the closed position and with its other end bears against the sealing element 13a. The spring 14 (FIG. 1) acting on the nozzle needle 13 is situated above the sealing element 13a and has not been shown for the sake of simplicity.

The fuel is admitted through the passage 22 formed in the nozzle body 3 into the space housing the spring 11. From there, it passes through the equalizing passages 42 provided in the hollow needle 9 to the seating face 39 and through further passages 43 even into an annulus 44 provided around the hollow needle 9.

In this embodiment only 1 sealing cylinder is required to close off the injection nozzle, i.e. the sealing element 13a. Here the second nozzle needle 13 will open first as sooon as the sealing element 13a is acted upon by the fuel. As soon as the dog 41 reaches the abutting face 40 it will engage the hollow needle 9 to cause the nozzle hole 25 to be opened, too.

Finally, FIG. 9 shows a variant of the embodiment in FIG. 8 where the hollow needle 9 is also formed as a short sleeve. It surrounds the second nozzle needle 13 directly whereas sufficient space is provided between its outer diameter and the bore 38 of the nozzle body 3 to admit fuel from the main pressure space 23 via the ports 45 provided in the hollow needle 9 to the annulus 24. A pin 41 is fitted through the nozzle needle 13 perpendicular to its longitudinal axis to serve as a dog which as the nozzle needle 13 is opened will eventually contact the abutting face 40 formed by oblong holes in the hollow needle 9 thereby causing it to open, too. The engagement of the hollow needle 9 may also be effected by a twist lock or similar device.

I claim:

1. A multi-hole injection nozzle for air-compressing, direct-injection internal combustion engines, in particular internal combustion engines employing the method of wall deposition of the fuel comprising essentially a nozzle body and two nozzle needles held by springs in positions where the nozzle holes in the nozzle body are closed with the springs being designed so that initially while a low fuel pressure exists one nozzle needle opens whereas the second nozzle needle is lifted off its seat only at an increased fuel pressure, characterized in that one nozzle needle (9) is formed as a hollow needle and in that the second needle (13) is axially slidable in its axial bore (7) and in that the hollow needle (9) is capable of closing one or a plurality of nozzle holes (25) situated at a distance from the tip (26) of the injection nozzle and in that the second nozzle needle (13) is capable of closing one or a plurality of nozzle holes (27) situated close to the tip (26) and having different cross sectional areas.

2. A multi-hole injection nozzle as in claim 1, characterized in that the fuel loaded faces and/or the springs (11,14) of the hollow needle (9) and the second nozzle needle (13) are designed and tuned up in a manner that one of the two nozzle needles (9, 13) is lifted off its seat (12, 16) already during starting or respectively idling of the engine, whereas the other nozzle needle opens only in the upper load range.

3. A multi-hole injection nozzle as in claim 1, characterized in that the nozzle holes (25, 27) extend substantially parallel to each other.

4. A multi-hole injection nozzle as in claim 1, characterizing that the nozzle holes (25, 27) extend substantially in one direction.

5. A multi-hole injection nozzle as in claim 1, characterized in that the hollow needle (9) and/or the second nozzle needle (13) are provided with means (17, 18) for fixed or variable adjustment of the needle lift.

6. A multi-hole injection nozzle as in claim 1, characterized in that the bore (7) of the hollow needle (9) is formed as a guide for the second nozzle needle (13).

7. A multi-hole injection nozzle as in claim 1, characterized in that the second nozzle needle (13) comprises several components (13, 13a) finished to different degrees of accuracy and arranged axially in tandem.

8. A multi-hole injection nozzle as in claim 1, characterized in that an annular main pressure space (23) is provided above the seat (8, 12) for the hollow needle (9) directly ajoining the hollow needle (9) and in that a further annulus (24) capable of receiving fuel to open the second nozzle needle (13) is provided between the seat (12) for the hollow needle (9) and the seat (16) for the second nozzle needle (13). the second nozzle needle (13).

9. A multi-hole injection nozzle as in claim 1, characterized in that passages (31) which are not capable of being closed are provided between the main pressure space (23) and the annulus (24) to admit fuel simultaneously to the hollow needle (9) and the second nozzle needle (13).

10. A multi-hole injection nozzle as in claim 8, characterized in that the nozzle holes (25) arranged at a greater distance from the tip (26) of the injection nozzle terminate in the lower annulus (24).

11. A multi-hole injection nozzle as in claim 1, characterized in that the seating faces (15, 16) on the second nozzle needle (13) are formed with a conical, truncated cone or spherical shape.

12. A multi-hole injection nozzle as in claim 1, characterized in that the nozzle holes (25) arranged at a greater distance from the tip (26) of the injection nozzle terminate in the seat (12) of the hollow needle (9).

13. A multi-hole injection nozzle as in claim 8, characterized in that the main pressure space (23) is situated as remotely as possible from the tip (26) of the injection nozzle in the nozzle body (3) and in that the hollow needle (9) is a tight fit but slidable in the nozzle body (3) only above the main pressure space (23).

14. A multi-hole injection nozzle as in claim 1, characterizing that the lower part of the second nozzle needle (13) is a loose fit in the bore (7) of the hollow needle (9) and formed with a flange (34) at its end away from the nozzle holes (25, 27) and situated in a larger diameter bore (7a) of the hollow needle (9), and in that with the nozzle needles (9, 13) closed a clearance (36) exists between the flange (34) and an abutment (35) provided in the large diameter bore (7a) in the axial direction, and in that a sealing element (13a) is provided on the extended axis of the second nozzle needle (13) which is sealed and guided in the larger bore (7a) of the hollow needle (9) and maintained in contact with the flange (34) by the force of the spring (14).

15. A multi-hole injection nozzle as in claim 1, characterized in that as the hollow needle (9) opens against the force of the spring (11) acting upon it the claimance (36) becomes zero and in that the second nozzle needle (13) is moved also in the opening direction by the dog (35) against the force of the spring (14) acting upon it.

16. A multi-hole injection nozzle as in claim 1, characterized in that the bore (7) in the hollow needle (9) is of constant diameter throughout and communicates through ports (45) situated close to the nozzle holes (25) substantially horizontally in the hollow needle (9) through a clearance (33) provided around the hollow needle (9) with the main pressure space (23), and in that the second nozzle needle (13) is supported slidably in the bore (7) by means of a sealing element (13a) provided at its upper end and a sealing element (13b) formed integral with it directly above the ports (45).

17. A multi-hole injection nozzle as in claim 1, characterized in that a group of one nozzle hole (25) controllable by the hollow needle (9) and a nozzle hole (27) controllable by the second nozzle needle (13) are combined ahead of the outlet from the nozzle body (3) in a single hole (37).

18. A multi-hole injection nozzle as in claim 1, characterized in that the hollow needle (9) is formed as a short sleeve provided with an abutting face (40), and in that the second nozzle needle (13) is firmly connected with a sealing element (13a) guided in a bore (38) of the nozzle body (3) and has a dog (41) below the abutting face (40) of the hollow needle (9), and in that the spring (11) for closing the hollow needle (9) is situated between the hollow needle (9) and the sealing element (13a) of the second nozzle needle (13) in the bore (38).

19. A multi-hole injection nozzle as in claim 1, characterized in that only one conical or truncated cone-shaped seat (39) is provided in the nozzle body (3) for the hollow needle (9) and the second nozzle needle (13).

20. A multi-hole injection nozzle as in claim 18, characterized in that the blind-end bore (38) in the nozzle body (3) housing the nozzle needles (9, 13), is of constant diameter throughout.

21. A multi-hole injection nozzle as in claim 18 characterized in that the hollow needle (9) is a sliding fit in the blind-end bore (38) of the nozzle body (3).

22. A multi-hole injection nozzle as in claim 18, characterized in that the dog (41) is formed as a circlip capable of being clamped in a recess of the second nozzle needle (13).

23. A multi-hole injection nozzle as in claim 1, characterized in that the hollow needle (9) is guided on the second nozzle needle (13) and has substantially horizontal ports (45) below the guiding member to permit the passage of fuel.

24. A multi-hole injection nozzle as in claim 18, characterized in that the dog (41) is formed as a pin fitted in the second nozzle needle.

* * * * *